US009662952B2

(12) United States Patent
Funke et al.

(10) Patent No.: US 9,662,952 B2
(45) Date of Patent: May 30, 2017

(54) VIBRATION DAMPER

(71) Applicant: Hitachi Automotive Systems Europe GmbH, Schwaig/Oberding (DE)

(72) Inventors: Joachim Funke, Otzberg (DE); Matthias Bruns, Wiesbaden (DE); Nils Herrmann, Bad Koenig (DE); Lucien Johnston, Frankfurt am Main (DE); Dorothea Adams, Buettelborn (DE)

(73) Assignee: Hitachi Automotive Systems Europe GmbH, Schwaig/Oberding (DE)

( * ) Notice: Subject to any disclaimer, the term of this patent is extended or adjusted under 35 U.S.C. 154(b) by 0 days.

(21) Appl. No.: 14/654,224

(22) PCT Filed: Dec. 20, 2013

(86) PCT No.: PCT/EP2013/003893
§ 371 (c)(1),
(2) Date: Nov. 11, 2015

(87) PCT Pub. No.: WO2014/135183
PCT Pub. Date: Sep. 12, 2014

(65) Prior Publication Data
US 2016/0059656 A1    Mar. 3, 2016

(30) Foreign Application Priority Data

Dec. 21, 2012 (DE) .................. 10 2012 025 137
Mar. 7, 2013 (DE) .................. 10 2013 003 841

(51) Int. Cl.
*F16F 9/18* (2006.01)
*B60G 13/08* (2006.01)
(Continued)

(52) U.S. Cl.
CPC .............. *B60G 13/08* (2013.01); *F16F 9/062* (2013.01); *F16F 9/34* (2013.01); *F16F 9/346* (2013.01);
(Continued)

(58) Field of Classification Search
CPC .... F16F 9/06; F16F 9/062; F16F 9/185; F16F 9/346; F16F 9/532; F16F 2224/043
(Continued)

(56) References Cited

U.S. PATENT DOCUMENTS 2,661,596 A    12/1953  Winslow
4,139,186 A     2/1979  Postema et al.
(Continued)

FOREIGN PATENT DOCUMENTS

DE    34 43 183    5/1986
DE    36 31 107    3/1988
(Continued)

OTHER PUBLICATIONS

International Search Report of the International Searching Authority for International Application PCT/EP2013/003893, mailed May 9, 2014, 2 pages, European Patent Office, HV Rijswijk, Netherlands.
(Continued)

*Primary Examiner* — Thomas Irvin
(74) *Attorney, Agent, or Firm* — W. F. Fasse

(57) ABSTRACT

A vibration damper for damping spring retraction and extension forces on vehicles includes an inner pressure medium cylinder, in which a piston with a piston rod is axially slidably arranged to divide the inner cylinder into a retraction chamber and an extension chamber in which an electrorheological fluid is contained as a pressure medium. The two chambers are connected through at least one throttle gap between the inner cylinder and an electrode tube arranged coaxially thereto. The electrode tube is surrounded coaxially
(Continued)

by an outer tube which forms a gas pressure chamber connected with the retraction chamber through a bottom valve. Axially linear or helical seals are arranged between the inner cylinder and the electrode tube, and divide the throttle gap into at least two valve partial gaps. A throttled non-return valve opens toward the gas pressure chamber between the extension chamber and the gas pressure chamber.

11 Claims, 3 Drawing Sheets

(51) Int. Cl.
- *F16F 9/53* (2006.01)
- *F16F 9/346* (2006.01)
- *F16F 9/34* (2006.01)
- *F16F 9/06* (2006.01)

(52) U.S. Cl.
CPC .......... *F16F 9/532* (2013.01); *B60G 2202/24* (2013.01); *B60G 2500/10* (2013.01); *F16F 9/06* (2013.01); *F16F 9/185* (2013.01); *F16F 2224/043* (2013.01); *F16F 2230/24* (2013.01)

(58) Field of Classification Search
USPC ...................................... 188/267, 267.1, 315
See application file for complete search history.

(56) References Cited

U.S. PATENT DOCUMENTS

| | | |
|---|---|---|
| 4,790,522 A | 12/1988 | Drutchas |
| 4,819,772 A | 4/1989 | Rubel |
| 4,880,216 A | 11/1989 | Hartel et al. |
| 4,896,752 A | 1/1990 | Shtarkman |
| 4,898,084 A | 2/1990 | Oppermann et al. |
| 5,000,299 A * | 3/1991 | Goto ............... F16F 9/532 188/267.1 |
| 5,018,606 A | 5/1991 | Carlson |
| 5,259,487 A | 11/1993 | Petek |
| 5,316,112 A | 5/1994 | Kimura et al. |
| 5,353,839 A | 10/1994 | Kordonsky et al. |
| 5,353,897 A | 10/1994 | Woessner |
| 5,449,150 A | 9/1995 | Watanabe et al. |
| 5,458,217 A | 10/1995 | Ohishi |
| 5,477,946 A | 12/1995 | Kawamata et al. |
| 5,489,009 A | 2/1996 | Kawamata et al. |
| 5,522,481 A * | 6/1996 | Watanabe ............... F16F 9/532 188/267.1 |
| 5,553,828 A | 9/1996 | Jaenker |
| 5,588,509 A | 12/1996 | Weitzenhof et al. |
| 5,590,745 A | 1/1997 | Rensel et al. |
| 5,884,959 A | 3/1999 | Hillen |
| 5,934,422 A | 8/1999 | Steed |
| 5,947,238 A | 9/1999 | Jolly et al. |
| 6,095,486 A | 8/2000 | Ivers et al. |
| 6,131,709 A | 10/2000 | Jolly et al. |
| 6,152,488 A | 11/2000 | Hedderly et al. |
| 6,158,470 A | 12/2000 | Ivers et al. |
| 6,189,919 B1 | 2/2001 | Sinnhuber et al. |
| 6,375,220 B1 | 4/2002 | Kamm |
| 6,378,558 B1 | 4/2002 | Pohl et al. |
| 6,419,057 B1 | 7/2002 | Oliver et al. |
| 6,695,102 B1 | 2/2004 | Marjoram et al. |
| 6,745,876 B2 | 6/2004 | Beck |
| 6,749,045 B2 | 6/2004 | Rosenfeldt et al. |
| 6,874,603 B2 | 4/2005 | Lisenker et al. |
| 7,997,392 B2 | 8/2011 | Stork et al. |
| 8,393,446 B2 * | 3/2013 | Haugen ............... B60G 13/14 188/266.7 |
| 8,684,367 B2 * | 4/2014 | Haugen ............... B60G 13/14 188/266.7 |
| 8,925,933 B2 * | 1/2015 | Haugen ............... B60G 13/14 280/124.158 |
| 2001/0054529 A1 | 12/2001 | Wendt et al. |
| 2002/0185347 A1 | 12/2002 | Pohl et al. |
| 2003/0127293 A1 | 7/2003 | Rosenfeldt et al. |
| 2010/0066051 A1 * | 3/2010 | Haugen ............... B60G 13/14 280/124.157 |
| 2014/0159379 A1 * | 6/2014 | Haugen ............... B60G 13/14 290/1 E |

FOREIGN PATENT DOCUMENTS

| | | |
|---|---|---|
| DE | 36 32 562 | 4/1988 |
| DE | 37 09 447 | 10/1988 |
| DE | 38 08 521 | 4/1989 |
| DE | 40 02 448 | 8/1990 |
| DE | 197 17 704 | 10/1998 |
| DE | 103 20 005 | 10/2004 |
| DE | 102007026378 | 11/2008 |
| DE | 102010013566 | 10/2011 |
| DE | 102011117626 | 1/2013 |
| EP | 0 261 427 | 3/1988 |
| EP | 0 382 171 | 8/1990 |
| EP | 0 460 808 | 12/1991 |
| EP | 0 534 327 | 3/1993 |
| EP | 0 581 476 | 2/1994 |
| EP | 0 673 478 | 3/1997 |
| EP | 0 769 637 | 4/1997 |
| EP | 0 882 636 | 12/1998 |
| EP | 1 273 820 | 1/2003 |
| EP | 1 437 526 | 7/2004 |
| FR | 1 419 551 | 10/1965 |
| GB | 1 278 764 | 6/1972 |
| GB | 1 282 568 | 7/1972 |
| GB | 1 381 785 | 1/1975 |
| GB | 1 599 565 | 10/1981 |
| GB | 2 193 785 | 2/1988 |
| JP | 05-187471 A | 7/1993 |
| JP | 06-058364 A | 3/1994 |
| WO | WO 99/22162 | 5/1999 |

OTHER PUBLICATIONS

PCT International Preliminary Report on Patentability including English Translation of PCT Written Opinion of the International Searching Authority for International Application PCT/EP2013/003893, issued Sep. 8, 2015, 6 pages, International Bureau of WIPO, Geneva, Switzerland.

"Applications of the Electrorheological Effects in Engineering Practice", by Gorodkin et al.; FLUID MECHANICS, Soviet Research, vol. 8, No. 4, Jul.-Aug. 1979, pp. 48-61.

Literal Translation of PCT International Application PCT/EP99/03123, filed on May 6, 1999, 19 pages.

\* cited by examiner

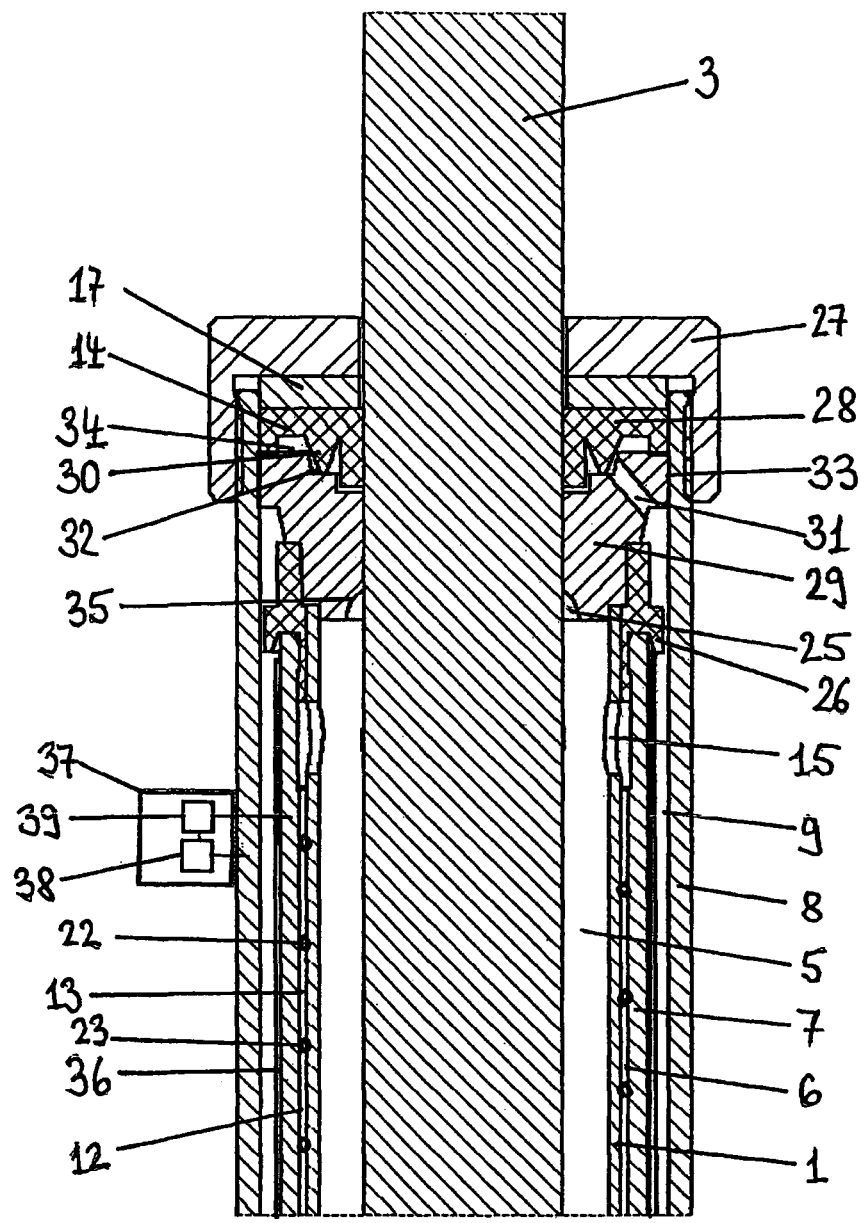

VIBRATION DAMPER

FIELD OF THE INVENTION

The invention relates to a vibration damper for damping spring retraction and spring extension forces on motor vehicles.

BACKGROUND INFORMATION

In motor vehicles, vibration dampers serve to ensure that the vibrations of the chassis quickly decay as sprung masses, in order to ensure the driving stability and to achieve a desired driving comfort. For this, usually hydraulic vibration dampers are utilized, in which an axially slidable piston is guided in a cylinder filled with oil. On the piston there is arranged a piston rod that is led upwardly out of the cylinder in a sealed manner and secured on the vehicle chassis. On the other hand, the bottom end of the cylinder is preferably mounted on a wheel or axle part. Thereby, the piston divides the cylinder into an upper extension chamber and a lower retraction chamber, which are connected with one another via at least one throttle valve. In order to compensate for a retracting or submerging piston rod, the retraction chamber is additionally still connected with a gas pressure chamber, in which a pre-pressure of approximately 20 to 30 bar is introduced, in order to avoid a cavitation. In order to regulate or control the damping forces, the throttle valves can be embodied to be electromagnetically adjustable, in order to be able to adapt the driving behavior of the motor vehicle to a prescribed vibration damping and/or a desired driving comfort. However, such throttle valves are relatively slow in their regulating behavior, so that often rapid vibration variations cannot be damped quickly enough.

From the DE 10 2007 026 378 A1, a vibration damper for motor vehicles is known, which is embodied with an electrorheological throttle valve and thereby enables a very rapid vibration regulation. In that regard, a spaced-apart electrode tube is arranged around the inner cylinder tube and together with the inner cylinder tube forms a throttle gap. In that regard, the throttle gap is connected with both the retraction as well as the extension chamber, wherein the viscosity of the electrorheological fluid flowing through the throttle gap is controllable via a high voltage between the electrode tube and the inner cylinder tube. However, this vibration damper, for the volume compensation of the piston rod, comprises an additional pneumatic pressure medium cylinder with a further piston, which is axially connected with the hydraulic cylinder as a so-called one-tube damper. Thereby, the vibration damper becomes not inconsiderably longer, which can lead to installation problems.

A further electrorheological vibration damper is known from the EP 0 261 427 B1, which is embodied as a so-called two-tube damper. In that regard, the shock absorber or shock damper consists of an inner cylinder tube, around which three further spaced-apart cylinder tubes are arranged coaxially as electrodes, which form three valve gaps around the inner cylinder tube. A further spaced-apart outer tube is additionally arranged coaxially to the electrode tubes, and is sealed relative to the extension chamber and is connected with the retraction chamber via a non-return valve that opens in connection with an extending piston, and forms a pneumatic gas pressure chamber. Because the throttle gaps are connected at the bottom with the gas pressure chamber and at the top with the extension chamber, and this represents a system of the communicating tubes or pipes, especially after longer service times this can lead to a portion of the gaseous pressure medium getting from the gas pressure chamber through the throttle gaps into the extension chamber and disadvantageously influencing the vibration damping.

Moreover, the two-tube damper also effectuates a relatively large outer diameter due to the three radially adjacently arranged throttle gaps, so that such an installation space, e.g. within helical coil springs, often is not available.

SUMMARY OF THE INVENTION

Therefore it is an object of at least one of the embodiments of the invention to improve a vibration damper of the initially described type so that it can be embodied with compact outer dimensions and achieves a vibration damping that remains just as good and rapid.

This object can be achieved by a vibration damper according to at least one of the embodiments of the invention set forth herein. Further developments and advantageous example embodiments of the invention are also set forth herein.

The invention has the advantage, that due to the non-return valve between the extension chamber and the gas pressure chamber, a gaseous pressure medium that has penetrated into the extension chamber or the throttle gap is quickly again directed back to the gas pressure chamber, whereby the desired vibration damping by means of the electrorheological fluid is maintained over the long term. Simultaneously thereby, the danger is reduced that voltage arcing occurs between the electrode poles due to a gaseous pressure medium in the valve gaps.

The invention further has the advantage that due to the formation of valve partial gaps between the inner cylinder tube and the electrode tube by means of seal means, a centering of the tubes is achieved, whereby also the accuracy of the gap heights can be improved. Thereby simultaneously the accuracy of the vibration damping is increased, because with a uniform gap height, a uniform viscosity is controllable over the entire gap length. This is especially achieved by the helically shaped seal means as a double helix, because these increase the gap lengths that are available for the viscosity control.

Moreover, due to the force-transmitting or frictional insertion of the seal means between the inner cylinder tube and the electrode tube, a higher mechanical stiffness of the vibration damper is achieved even with small wall thicknesses of the individual tubes.

In a particular embodiment of the invention it is additionally provided, to provide an electrical insulation layer or an insulation lacquer on the outer circumferential surface of the electrode tube, which has the advantage that thereby only a relatively small control energy is necessary, because hardly any control energy is radiated outwardly.

In a further particular embodiment of the invention, there is provided on the vibration damper an electronic control circuit as a high voltage electronics circuit, which calculates the control voltage value necessary for the prescribed damping based on the service time and the last traversed damper travel, whereby the advantage arises, that thereby the current rise or increase becomes limitable, and simultaneously a voltage arcing is reduced and an excessive temperature increase in the throttle gap is avoided.

BRIEF DESCRIPTION OF THE DRAWINGS

The invention is described in further detail in connection with an example embodiment, which is illustrated in the drawing. It is shown by:

FIG. 3: a cut-out section of the vibration damper with a non-return valve between the extension chamber and the gas pressure chamber.

DETAILED DESCRIPTION OF EXAMPLE EMBODIMENTS OF THE INVENTION

Figure 1:
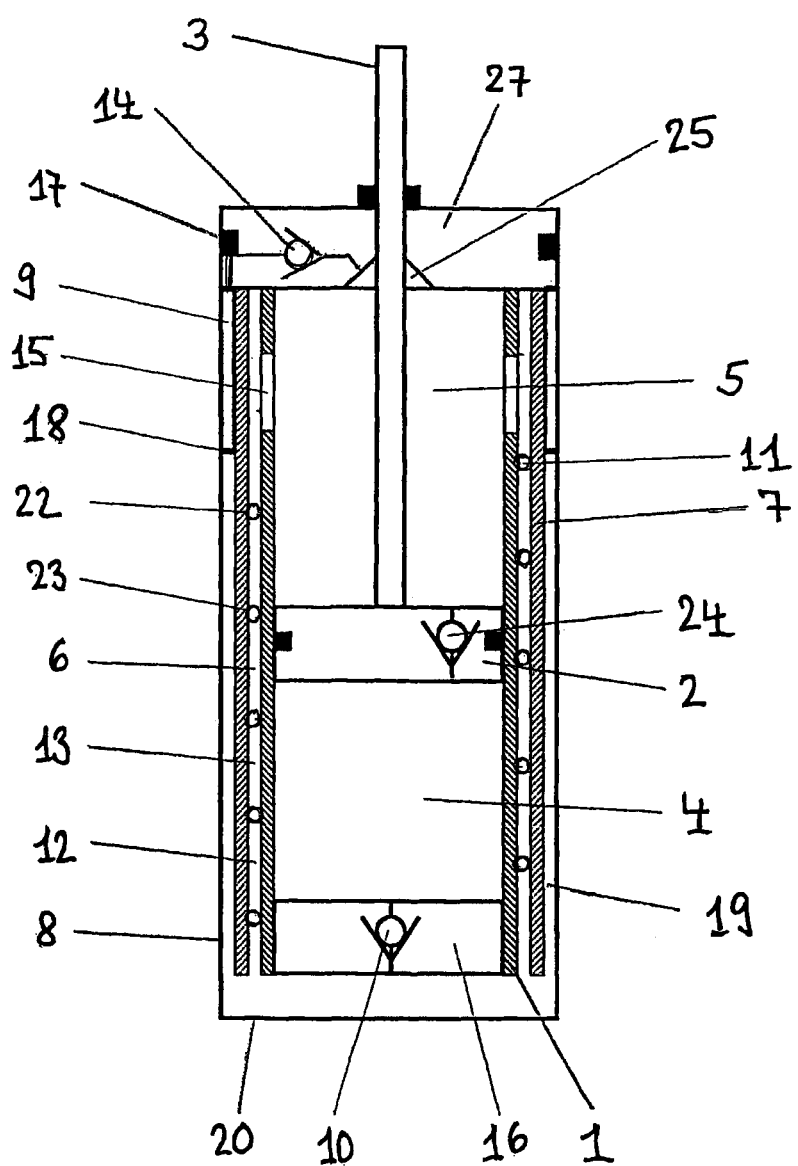
FIG. 1: a schematically illustrated electrorheological vibration damper.

In FIG. 1 of the drawing, a controllable hydraulic vibration damper with electrorheological fluid is schematically illustrated, which is embodied as a so-called two-tube damper as a shock damper or shock absorber for a motor vehicle. This vibration damper includes an inner cylinder tube 1, in which an axially slidable piston 2 is arranged, onto which is secured a piston rod 3 that is extendable upwardly in the installed position. In that regard, the piston 2 divides the inner cylinder tube 1 into an upper extension chamber 5 and a lower retraction chamber 4, in which an electrorheological fluid is filled as a hydraulic pressure medium. Coaxially to the inner cylinder tube 1, there is arranged a spaced-apart electrode tube 7 preferably of aluminum material, which comprises a ring-shaped gap as a throttle gap 6 to the inner cylinder tube 1. The throttle gap 6 is connected at its upper end with the extension chamber 5 through a bored hole 15 in the inner cylinder tube 1, and with the retraction chamber 4 through a third non-return valve 10 as a bottom valve in the inner cylinder lid 16 of the inner cylinder tube 1. Coaxially around the electrode tube 7, still further there is arranged a spaced-apart outer tube 8, of which the upper part represents a gas pressure chamber 9, into which is filled a pneumatic pressure medium that is provided with a low overpressure of approximately 2 to 3 bar. In its upper part, the gas pressure chamber 9 is sealed by a ring seal 17 between the electrode tube 7, an upper cylinder lid 27 and the outer tube 8.

In the lower region, the gas pressure chamber 9 is bounded or limited by the height of the electrorheological fluid, of which the fluid level 18 in the outer annular chamber 19 between the outer tube 8 and the electrode tube 7 depends on the respective piston position. For sealing the vibration damper, in the lower or bottom area, a lower cylinder lid 20 is mounted on the outer tube 8, which closes the outer annular chamber 19 to the outside.

The throttle gap 6 remaining between the inner cylinder tube 1 and the electrode tube 7 is divided into two similar valve partial gaps 12, 13 formed as a double helix, by two gap seals 22, 23 arranged in a helical shape. For that, two gap seals 22, 23 arranged offset by 180° are arranged as seal means 11 between the electrode tube 7 and the inner cylinder tube 1, which gap seals 22, 23 are shown in further detail individually in FIG. 2 of the drawing.

Figure 2:
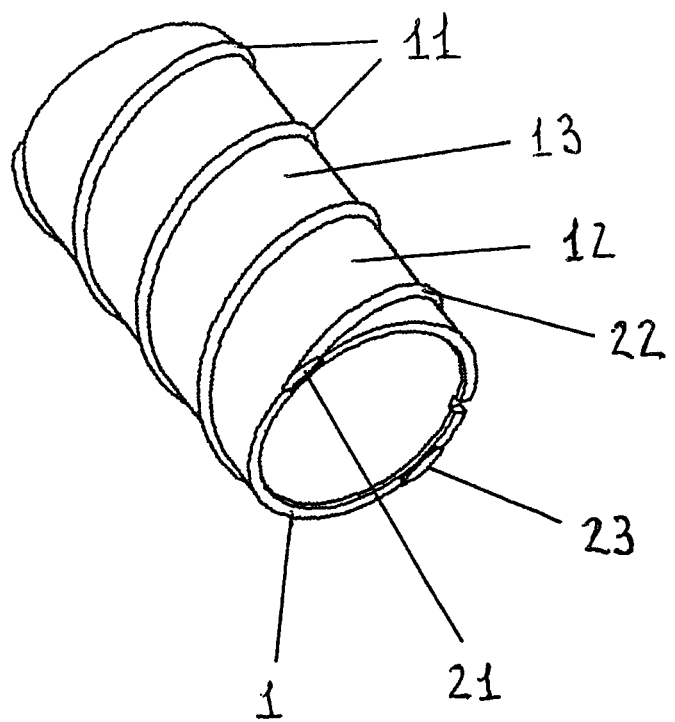
FIG. 2: a cut-out section of an inner cylinder tube with two helically shaped seal spirals.

The FIG. 2 of the drawing shows a portion of the inner cylinder tube 1, into which two helically shaped grooves 21 are milled, which comprise a prescribed pitch and comprise a uniform axial spacing distance from one another and represent a double helix. A first gap seal 22 is inserted or cast in place in the groove 21, and a second gap seal 23 is inserted or cast in place in the second groove 21 which is arranged offset by 180° relative to the first groove 21. These gap seals 22, 23 are preferably made of an elastomeric synthetic plastic or rubber material and protrude above the outer circumferential surface of the inner cylinder tube 1 by a prescribed gap height. Thereby, two valve partial gaps 12, 13, which are mutually sealed relative to one another, arise between the inner cylinder tube 1 and the electrode tube 7 that can be slidingly placed thereon, wherein the valve partial gaps 12, 13 respectively form a throttle valve through which the electrorheological fluid can flow from the extension chamber 5 into the retraction chamber 4. The gap seals 22, 23, could however similarly be arranged in similar grooves or through-going gaps in the inner region of the electrode tube 7, into which the inner cylinder tube 1 is then coaxially slidable. By such helically shaped gap seals 22, 23, similarly the throughflow path in the throttle valves is made longer, whereby the control possibility is improved.

However, the gap seals 22, 23 can also be arranged linearly, whereby then two parallel throttle gaps are formed. For improving the centering, it is also possible that more than only two valve partial gaps 12, 13, for example as a three-fold helix, can be arranged between the inner cylinder tube 1 and the electrode tube 7.

For avoiding a high pre-pressure in the gas pressure chamber 9, additionally there is provided in the piston 2 a second non-return valve 24 that is openable toward the extension chamber 5, through which valve the electrorheological fluid flows from the retraction chamber 4 into the extension chamber 5 during the retraction of the piston rod 3, whereby then the retracting piston rod volume gets through the valve partial gaps 12, 13 to the outer annular chamber 19 and there increases the fluid level 18.

Because in connection with longer service times, due to the principle of the communicating tubes and other operating conditions, also gas bubbles can get through the valve partial gaps 12, 13 out of the gas pressure chamber 9 into the extension chamber 5, a gas collection space 25 is provided at the uppermost point of the extension chamber 5 in the area of the upper cylinder lid 27 or an annular ring part in communication therewith, which gas collection space is connected with a special throttled first non-return valve 14, of which the outlet side communicates into the gas pressure chamber 9.

The embodiment of this first non-return valve 14 is shown in further detail in FIG. 3 of the drawing, which shows a sectional view of the upper vibration damper part. In that regard, the throttled first non-return valve 14 consists of an annular or ring-shaped valve top part 28 and an annular or ring-shaped valve bottom part 29, which are arranged coaxially to the piston rod 3 under the ring seal 17 in the upper cylinder lid 27. In that regard, the valve upper part 28 is preferably made of a sealing elastomer, which at the top lies in a sealed manner on the ring seal 17 and with its central bored hole lies in a sealed manner on the piston rod 3, and comprises a downwardly oriented elastic ring-shaped seal lip 30, of which the point or peak stands in a sealed manner on a horizontal annular ring surface 32 of the valve bottom part 29. The valve bottom part 29 is similarly embodied annularly or ring-shaped, and preferably consists of a slidable or low-friction metal such as e.g. brass, which lies with its outer circumferential surface 33 on the inner side of the outer tube 8. Below the outer circumferential surface 33, the valve bottom part 29 lies in a sealed manner on an annular or ring-shaped electrode mount 26 which separates the electrode tube 7 in an electrically insulated manner from the inner cylinder tube 1 that is circuit-connected as a counter electrode, and which seals the valve partial gaps 12, 13 between the electrode tube 7 and the inner cylinder tube 1 relative to the gas pressure chamber 9.

The upper part of the gas pressure chamber 9 begins coaxially to the electrode mount 26 and is connected via a sloping or oblique bored connection hole 31 with the valve inner space 34, which remains between the valve top part 28 and the valve bottom part 29. Between the valve inner space 34 and the gas collecting space 25, the valve bottom part 29 in the pressureless condition lies in lightly sliding or gliding contact on the piston rod 3, and therewith forms a thin sliding gap, which lets gas bubbles through but is too narrow for a fluid and therefore forms a throttle gap. In the pressureless condition, after longer service times or other operating conditions, gas bubbles often collect or accumulate out of the valve partial gaps 12, 13 at the highest location in the gas collecting space 25. If now the vibration damper is actuated, thereby the pressure in the extension chamber 5 increases, so that a small passage gap is formed as a throttle gap along the piston rod outer surface to the valve inner space 34 through the sloping or rounded-off bounding surface 35 on the valve bottom part 29 in the area of the gas collecting space 25, into which gap then the overpressure with the gas bubbles extends. Thereby, the seal lip 30 is pressed radially outwardly and releases or opens the path for the gas bubbles to the bored connection hole 31. As soon as the pressure in the gas pressure chamber 9 reaches the pressure in the extension chamber 5, the seal lip 30 of the throttled first non-return valve 14 closes, so that the following electrorheological fluid cannot escape. Thereby, the quantity of pneumatic pressure medium collected in the extension chamber 5 is always again directed back into the gas pressure chamber 9 after only a few piston movements, so that the pneumatic pressure medium cannot impair the damping force of the vibration damper.

For controlled actuation of the vibration damper with a high voltage, still further a high voltage electronics 37 is arranged preferably in the outer tube 8, wherein the high voltage electronics includes at least one controllable high voltage power network part 39 and a program controlled electronic circuit 38. In that regard, the controllable high voltage power network part 39 forms from the vehicle voltage a high voltage that comprises approximately a high voltage value of about 5000 V/mm depending on the gap height, in order to produce a maximum damping force. In order to enable an exact throughflow control in the valve partial gaps 12, 13 it must further be ensured that in the operating condition no voltage arcs arise between the electrode tube 7 and the inner cylinder tube 1 that is circuit-connected as a counter electrode, which preferably then arises if gas bubbles of the pneumatic pressure medium are located in the valve partial gaps 12, 13. Such a case often arises in a two-tube damper after long standstill times, because according to the principle of communicating tubes or pipes, it orients itself to a uniform fluid level. Therefore, the program-controlled electronic circuit 38 additionally detects the standstill time, the temperature of the electrorheological fluid and the piston travel that was traversed before the standstill. Because such gas bubbles get into the extension chamber 5 after short operation of the vibration damper, at first the provided high voltage is controlled in a slowly increasing manner, in that during this retraction phase the electronic circuit 38 calculates the rising control voltage from the prescribed characteristic curves or progressions, according to which rising control voltage a voltage arcing is avoidable in this phase. Because this is similarly also dependent on the fluid temperature, the detected temperature is also taken into account in the calculation of the voltage. From that, for the start-up path of the vibration damper, a high voltage is calculated and the high voltage power network part 39 is correspondingly controlled, so that an optimized high voltage is present on the electrode tube 7 in order to control the desired damper force without leading to voltage arcs.

Simultaneously, a possible impermissible current rise or increase is monitored by the electronic circuit 38, wherein this current increase can represent an indication for a voltage arc. For this, characteristic curves or progressions are input into the electronic circuit 38, wherein the characteristic curves or progressions correspond to the specified or nominal values of the control current, and which are respectively compared with the detected actual values, and upon exceeding a prescribed limit value the controlled high voltage is reduced. Thereby possible voltage arcs can be extinguished, whereby then the nominal value progression is again set in an adjusted manner.

Moreover, for limiting the control energy, the electrode tube 7 is provided on the outside with an insulating coating or an insulating lacquer 36, in order to reduce the radiation outwardly, especially into the outer annular chamber 19. Thereby especially the dimensioning of the high voltage network part 39 can be reduced, whereby this can be embodied more simply and compactly.

In driving operation, the above described vibration damper operates as follows:

In connection with driving vibrations introduced via the axle, upon spring extension the outer tube 8 moves downwardly, so that a pressure is exerted on the upper piston surface by the electrorheological fluid as a pressure medium that is located in the extension chamber 5. Thereby the electrorheological fluid located in the extension chamber 5 flows through the bored holes 15 and the valve partial gaps 12, 13 into the outer annular chamber 19 and through the bottom valve 10 into the retraction chamber 4. Thereby the piston 2 with its piston rod 3 moves vertically upwards into the extension chamber 5, whereby the out-flowing electrorheological fluid and simultaneously the volume portion of the piston rod 3 gets out of the outer annular chamber 19 through the bottom valve 10 into the retraction chamber 4. Thereby also the fluid level in the outer annular chamber 19 sinks, whereby simultaneously the gas pressure chamber 19 expands due to its pre-pressure. Thereby the electrorheological fluid in the uninfluenced or voltage-free condition behaves like a hydraulic fluid, so that such a vibration damper without control voltage basically operates like a typical conventional hydraulic shock damper.

The damping effect of such a shock damper can now additionally be increased by the application of a control high voltage to the electrode tube 7, whereby the viscosity of the electrorheological fluid correspondingly changes. Namely, by the application of a control voltage, an electric field is produced, through which the viscosity of the electrorheological fluid can be increased as desired. Therefore the vibration damper is preferably controlled so that at high spring retraction speeds corresponding to a prescribed spring retraction characteristic curve, the voltage is increased so far that the wheel vibrations relative to the vehicle chassis are correspondingly damped. Because a force is transmitted to the vehicle chassis by the spring retraction vibration, as a result thereof there also arises a spring extension vibration, which can also correspondingly be damped.

The invention claimed is:

1. A vibration damper for damping spring retraction and/or spring extension forces on motor vehicles, comprising:
   an inner pressure medium cylinder;
   a piston with a piston rod axially slidably arranged in the inner pressure medium cylinder, wherein the piston divides the inner pressure medium cylinder into a retraction chamber and an extension chamber;

a pressure medium comprising an electrorheological fluid contained in the retraction and extension chambers;

an electrode tube arranged coaxially around the inner pressure medium cylinder;

at least one throttle gap between the inner pressure medium cylinder and the electrode tube, wherein the retraction chamber and the extension chamber are connected through the at least one throttle gap;

an outer tube that coaxially surrounds and is spaced-apart from the electrode tube, wherein the outer tube together with the electrode tube form a gas pressure chamber, which is connected through a bottom valve with the retraction chamber;

at least two axially linear or helically shaped seal means arranged between the inner pressure medium cylinder and the electrode tube, wherein the seal means divide the throttle gap into at least two similar valve partial gaps; and a first throttled non-return valve which opens toward the gas pressure chamber and is arranged between the extension chamber and the gas pressure chamber.

2. The vibration damper according to claim 1, wherein the inner pressure medium cylinder is closed by an inner cylinder lid at an end of the retraction chamber, and the bottom valve is embodied as a third non-return valve which opens toward the retraction chamber.

3. The vibration damper according to claim 1, wherein the seal means is secured in at least two helically shaped grooves or gaps on an inner circumferential surface of the electrode tube and consists of an elastomer of a rubber or synthetic plastic material, and forms at least one first gap seal and one second gap seal between the electrode tube and the inner pressure medium cylinder.

4. The vibration damper according to claim 1, further comprising a second non-return valve which opens toward the extension chamber and is arranged between the extension chamber and the retraction chamber.

5. The vibration damper according to claim 1, wherein the first throttled non-return valve is arranged in an area of an upper cylinder lid and consists of a ring-shaped valve top part and a ring-shaped valve bottom part, between which a valve inner space remains and which are arranged coaxially to the piston rod, wherein the valve bottom part has outer circumferential surfaces that seal the extension chamber relative to the gas pressure chamber, and the valve top part has outer and inner circumferential surfaces that seal the gas pressure chamber relative to an outside environment.

6. The vibration damper according to claim 5, wherein the valve bottom part toward the extension chamber comprises a bounding surface that slopes downwardly oriented outwardly, and that forms a gas collecting space coaxially relative to the piston rod in the extension chamber, wherein the valve bottom part consists of a slidable metal and forms a narrow throttle gap coaxially to the piston rod.

7. The vibration damper according to claim 5, wherein the valve top part comprises a downwardly oriented ring-shaped elastic seal lip, which at least in a pressureless condition lies in contact in a sealing manner on a horizontal annular ring surface of the valve bottom part, and at least one bored connection hole is arranged in the valve bottom part between the gas pressure chamber and the valve inner space.

8. The vibration damper according to claim 1, wherein the electrode tube on an outer circumferential surface thereof comprises an insulating lacquer layer or an insulating coating, which is embodied to shield an electrical field toward the outside.

9. The vibration damper according to claim 1, further comprising a high voltage electronic circuit that is arranged on the outer tube and is connected electrically and in a pressure-tight manner with the electrode tube, and is connected electrically with the outer tube, and wherein a high voltage thereof is controlled by a program-controlled electronic circuit.

10. The vibration damper according to claim 9, wherein the electronic circuit is configured to detect a standstill time, a temperature of the electrorheological fluid, and a piston rod travel that was traversed by the piston rod after a standstill, and therefrom to calculate and control an increasing high voltage that is prescribed according to a characteristic curve progression, through which a voltage arc between the electrode tube and the inner pressure medium cylinder is preventable.

11. The vibration damper according to claim 9, wherein the electronic circuit is further configured to detect an actual value of a current rise after the standstill time, and to compare the actual value with a prescribed nominal value progression, and upon exceeding a prescribed limit value to reduce the high voltage so far until the actual value follows the nominal value progression.

* * * * *